(12) United States Patent
Bitter et al.

(10) Patent No.: US 7,370,723 B2
(45) Date of Patent: May 13, 2008

(54) LOADING MACHINE

(75) Inventors: Marcus Bitter, Contwig (DE); Folker Beck, Maßweiler (DE)

(73) Assignee: Deere & Company, Moline, IL (US)

( * ) Notice: Subject to any disclaimer, the term of this patent is extended or adjusted under 35 U.S.C. 154(b) by 332 days.

(21) Appl. No.: 11/167,246

(22) Filed: Jun. 27, 2005

(65) Prior Publication Data

US 2006/0001224 A1 Jan. 5, 2006

(30) Foreign Application Priority Data

Jun. 29, 2004 (DE) ...................... 10 2004 031 248

(51) Int. Cl.
*B60K 28/08* (2006.01)
(52) U.S. Cl. .................... 180/290; 180/338; 340/693.3
(58) Field of Classification Search ................ 180/271, 180/279, 281–285, 290, 338; 340/679, 665, 340/440, 693.3; 414/699
See application file for complete search history.

(56) References Cited

U.S. PATENT DOCUMENTS

| | | | | |
|---|---|---|---|---|
| 2,774,437 A * | 12/1956 | Remde | ....................... | 180/282 |
| 3,724,679 A * | 4/1973 | Brownell et al. | ........... | 212/278 |
| 3,971,008 A * | 7/1976 | Nishizaki et al. | .......... | 340/522 |
| 4,027,772 A * | 6/1977 | Garber | ........................ | 414/699 |
| 4,029,213 A * | 6/1977 | Thompson et al. | ......... | 212/278 |
| 4,042,135 A * | 8/1977 | Pugh et al. | ................. | 414/718 |
| 4,093,091 A * | 6/1978 | Gregg et al. | ................ | 414/642 |
| 4,398,860 A * | 8/1983 | Downing et al. | ........... | 414/634 |
| 4,598,797 A * | 7/1986 | Schultz | ........................ | 187/223 |
| 4,747,462 A * | 5/1988 | Herrmann et al. | .......... | 180/233 |
| 4,838,756 A * | 6/1989 | Johnson et al. | ............. | 414/699 |
| 5,826,666 A * | 10/1998 | Tozawa et al. | ................ | 172/7 |
| 6,073,428 A * | 6/2000 | Diekhans | ................. | 56/10.2 R |
| 6,170,341 B1 * | 1/2001 | Avitan | ................... | 73/862.392 |
| 6,585,079 B1 * | 7/2003 | Weyer | ........................ | 182/2.7 |
| 6,618,967 B2 * | 9/2003 | Satzler et al. | ................. | 37/348 |
| 6,842,118 B2 * | 1/2005 | Igarashi et al. | ............. | 340/665 |
| 2004/0200644 A1 * | 10/2004 | Paine et al. | ................. | 177/136 |

* cited by examiner

*Primary Examiner*—Paul N. Dickson
*Assistant Examiner*—Drew J. Brown

(57) ABSTRACT

A loading machine is disclosed with at least one drive train, with at least one overload protection device for the drive train and with sensors for determining an overload state in the drive train. Critical operating conditions of the loading machine can be determined based on signals from the sensors, such that the load application on the drive train can be influenced in terms of power. The determination of critical operating conditions is implemented by means of a control unit which evaluates the signals from the sensors. When preset threshold values have been attained, the control unit generates control signals for a fuel injection pump, upon which a preventive limitation of the power is initiated.

10 Claims, 3 Drawing Sheets

LOADING MACHINE

BACKGROUND

1. Field of the Invention

The invention generally relates to a loading machine having a drive train with overload protection.

2. Related Technology

In agricultural, forestry and construction site working machines such as, loading machines, and more specifically, for example, in telescopic loaders, excavators/dredgers or cranes, more and more powerful engines are being used. As a rule, the increase in power is also associated with an increase in the moments of torque acting upon the drive train of the loading machine, wherein the operating state of the loading machine leads to moments of extreme traction in the drive axles. An overload in the drive train can occur when the maximum driving power of the engine is supplied to the drive line. As a result, damage can ensue to the drive train such as, for example, a break in the drive shaft.

In order to resolve the problem cited above, overload protection devices have been provided, wherein the engine power is limited so that in the event of an arising overload condition, the engine power is shifted down in order to protect the drive train from being damaged.

This type of power limitation has been previously practiced. Measuring devices are applied that sense magnitudes that would affect the drive train, such as a moment of torque. The measuring devices send signals to a control unit, which in turn generates a control signal for regulating or reducing the power output of the driving engine based on the signals received. Such measuring devices on the drive train require an expansive installation and are expensive.

The underlying problem of the invention is seen therein that an overload protection is made possible which does not require extensive measuring devices on the drive train.

SUMMARY OF THE INVENTION

In accordance with the invention, a loading machine of the type described in the introduction is provided, wherein the operating conditions of the loading machine can be determined and the load application on the drive train can be influenced in terms of power. Based on the determination of critical operating conditions for the loading machine, which can influence the load on the drive train and can therefore lead to overload conditions on the drive train, interceptions indicative of critical load conditions on the drive train can be ascertained and preventive limitation of engine power can be initiated. The overload protection device therefore comprises a determination of critical operating conditions for the loading machine which indirectly allow the determination that an overload exists on the drive train so that a direct acquisition of values measured for the flow of power within the drive train is rendered superfluous. Owing to the preventive power limitation of the engine, the drive train is maintained in a secure state from the onset.

With this, there is no need to directly or continuously monitor the overload status of the drive train until an overload condition sets in, upon which, a reduction or limitation in power is then initiated. Moreover, the drive train will always remain in a non-critical load state for the operating conditions such as, the application of load on a drive axle of a loading machine. Due to improper operation of the loading machine in a critical operating state, such as excessive acceleration during a simultaneous high load application on the axle, the drive train could reach a state of overload from excessively high tractive moments and suffer damage. By initiating power limitation when the loading machine reaches a state of critical operation, the occurrence of an overload state is prevented.

The loading machine is provided with an overload protection device which is comprised of a control unit that limits the power output to the drive train in response to signals. Preferably, an electronic control unit is hereby applied. The operating conditions for the loading machine are determined and a signal is sent to the control unit. The control unit picks up the signals delivered and generates a control signal to limit the power output of the engine. Hereby, the intervention at the level of engine regulation or engine control is preferably electronic and the power that is output by the engine is limited to a non-critical value for the drive train. For example, a signal from the gas pedal or from any other appropriate operating element (e.g., from a throttle hand lever in tractors) which reports to the engine via the control unit is limited electronically, in that the maximal value of the signal is reduced. This can occur by way of a simple control or also by way of a closed control loop.

It would also be conceivable, that in the case of engines whose fuel injection pump is mechanically controlled, that the displacement by the control mechanism be limited. The targeted objective is to hereby limit the amount of fuel injected into the engine in order to prevent a further increase in the power output which could lead to an overload in the drive train. Another possibility would consist in applying an electronically controlled fuel injection pump or an electronically controlled fuel injection system (e.g., common rail technique) by which the mapping characteristics of the engine (a so-called characteristic engine graph diagram) could be changed. The control unit can control the fuel injection pump or the fuel injection system and the mapping characteristics of the engine can be changed in such a manner that no power is being output which could overload the drive train and therefore negatively influence its service life. Here as well, the control can be a simple control or a closed control loop.

The means for determining a critical operating condition in the loading machine can be comprised, for example, of wire strain gages that are configured on one or on several axles of the loading machine, but preferably on a rear axle. By the use of wire strain gages, the flexing of an axle can be measured and can be consulted as a measure for the application load on another axle, for example, of the front axle. Owing to this, the load status of the vehicle as well as the position of the extension arm can also be determined, if only indirectly, then at least approximately, with or without load application. In this manner, the flexing of the rear axle can be measured by means of a wire strain gage ("WSG"="DMS") and based on this, the conclusion can be drawn, that as soon as the rear axle stops flexing, no more weight is being placed on it and that the weight of the vehicle and of its load is resting entirely on the front axle. This effect of unburdening the rear axle while simultaneously distributing any surplus load on to the front axle can be consulted for determining a critical operating condition or for determining a risk of overload on the front axle. Especially advantageous is also the fact that the horizontal position of the loading machine, and thus the angle of inclination of the loading machine or the angle of inclination of the ground surface under the loading machine can be integrated into the evaluation of a critical operating condition. The angle of inclination during loading operations, for example, at a pit/mine or on the side of a slope, can lead to a redistribution of the forces exerted upon the axles.

As means for determining a critical operating condition for the loading machine, wire strain gages can also be arranged on the extension arm [boom, jib etc.] of the loading machine. In this case, the deflection of the extension arm is measured at the appropriate point and is consulted as a measure for the load status. The more the extension arm bends, the greater the load application must be on the front axle based on the geometric configuration conditions. If the extension arm were to be variable in its length, then a critical operating condition could be determined based on its minimal length, since in the normal case scenario, a shift in the distribution of the load from the rear axle to the front axle takes place as the length of the extension arm increases due to the changes in the lever configuration conditions.

In another embodiment, pressure sensors are configured on an actuator, in particular, on a hydraulic or pneumatic cylinder. In this embodiment the pressure is measured on the lifting side of the lifting cylinder installed for lifting and lowering the extension arm. Hereby, the pressure acting in the lifting cylinder can be consulted as a measurement of the load application on the front axle and for determining a critical operating status. Here as well, in the case of an extension arm having a variable length, it should be possible to determine a critical operating condition based on knowing the minimal length of the extension arm, since in the normal case scenario, the pressure on the lifting cylinder will increase as the length of the extension arm increases due to the changes in the lever configuration conditions.

In order to obtain a more accurate determination of a critical operating condition, position sensors can be installed as a further measure to determine the exact position or posture of the extension arm relative to the angle of attack (slewing angle) and/or relative to the length of extension. Owing to the signals from the position sensors, the lever configuration conditions and force distribution factors, that vary for the vehicle depending on the manipulation of the extension arm (driving out/driving in, lifting/lowering), can be taken into consideration for making the determination of a critical operating condition. In this manner, critical operating conditions can be more narrowly defined so as to avoid having to unnecessarily and prematurely impose a limit on the power requirements.

Furthermore, it is conceivable that the pressure can be measured on the lifting side of an actuator such as, for example, of a dumping cylinder, which is used for tipping a tool arranged on the extension arm. At the same time, the exact position of the extension arm can be determined. Once the values for the pressure and positions have been acquired, the load status can be established and the instance of a critical operating condition can be determined.

In still another embodiment, the means for determining a critical operating condition are comprised of sensors which establish a vehicle speed. In the presence of a torque converter arranged on the power train of the vehicle, a maximal moment of torque distributed over the axles of the vehicle will increase in the normal case scenario when there is a lower vehicle speed or a lower torque converter output speed. Therefore, the speed of the vehicle can be consulted as a measure for a critical operating condition of the loading machine or of the vehicle, so that a measuring signal of the vehicle's speed can be used for the preventive limitation of engine output.

In yet another embodiment, sensors for determining a critical operating condition are applied that sense the gear adjustment of the gearbox of the loading machine. In the case of greater gearing up activity, or of lower gear speeds, the maximal moments of torque exerted on the drive train of the vehicle or of the loading machine will increase so that critical operating conditions can set in. This possibility can be considered as being quite simple, since in this case, it can be established in what gear the gearbox of the vehicle is engaged and based on this, a critical operating condition can be defined in order to limit the maximum engine output.

Furthermore, it is possible to use a first control signal, generated by a control unit, as a measure providing signal for the generation of a further signal for limiting the driving power. This would be the case when a signal is sent out by a control unit, such as, a gear shift signal for an automatic transmission, and in function of this, the generation of a signal for limiting the driving power would be initiated by the same control unit. It is also conceivable that a second control unit is present which generates a first signal, and the signal for limiting the driving power is generated by the first control unit. The means for determining an overload state can therefore also be comprised of signals sent out by a control unit.

In another embodiment, the sensing means can be comprised of pressure sensors which are configured on one or on several hydraulic or pneumatic actuators, preferably on hydraulic cylinders. Here, the hydraulic cylinders we are dealing with are preferably configured between the frame and the axles of the loading machine in order to maintain or to change an adjustable position of the frame in terms of its lateral inclination relative to the ground surface under the loading machine or relative to the axles. Furthermore, these cylinders can also be used for cushioning the axles of the vehicle to promote riding comfort. To this end, the pressure in the hydraulic cylinders can be measured, wherein the front axle of the vehicle is maintained in its position. The pressure which is exerted on the lifting side of the cylinders can also be consulted as a measure for the determination of a critical operating condition, whereby, the pressure on the lowering side of the cylinders can also be measured, in order to compensate for a incorrect measuring result due to a possible distortion/twisting of the cylinder.

The advantages of the invention consist therein that the drive train is protected against overload based on the preventive limitation of power with the incidence of a critical operating state for the loading machine. The occurrence of extreme load applications on the drive train can be avoided, such that more cost effective axle constructions can be used which are setup for only normal operation. A further advantage consists therein that previously installed vehicle components can often times be used (such as, e.g., a fuel injection pump, an electrical control unit, means for determining the speed of the vehicle, wire stain gages); they just need to be interconnected.

As an alternative, it is also possible, in place of the sensors, for example, in place of the position sensors or of the pressure sensors, to install switches, more specifically, pressure switches and/or position switches which, upon activation by a limit pressure that sets in or by a release mechanism induced by a moving part, trigger a corresponding signal for the determination of an overload state.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
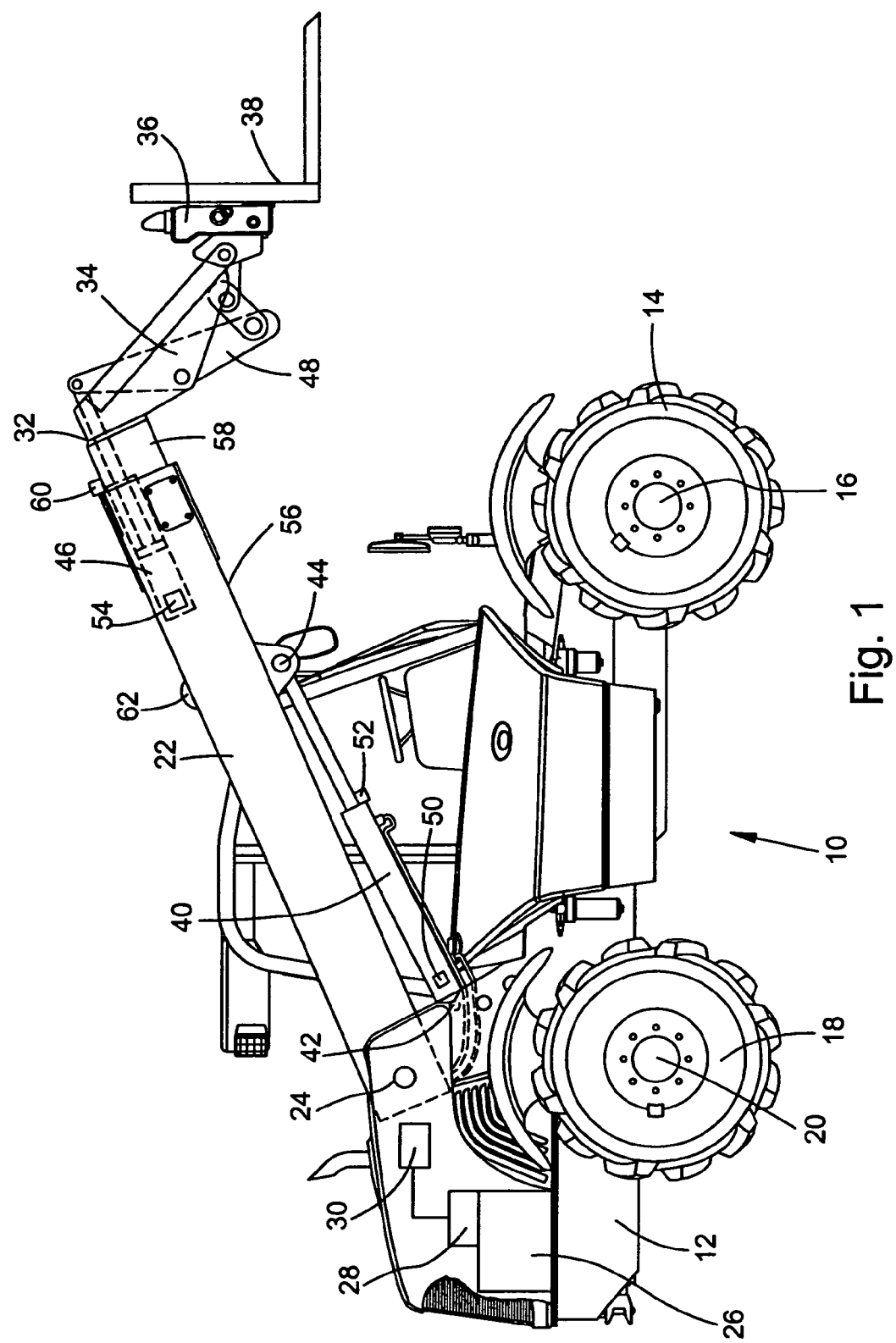
FIG. 1 a schematic side view of a loading machine in accordance with the invention with means for determining critical operating conditions.

FIG. 1 illustrates an all wheel drive loading machine 10 in the form of a telescopic loader. The loading machine 10 includes a frame 12 which is supported by a front axle 16, provided with front drive wheels 14, and by a rear axle 20, provided with rear drive wheels 18. The loading machine 10 includes an extension arm 22 which is pivotably anchored around a rotational axis 24 on the frame 12, parallel to the drive axles 16, 20.

Furthermore, the loading machine includes a driving engine 26, which is supplied with fuel by an electronically controlled fuel injection pump 28. Furthermore, an electronic control unit 30 is provided which is connected to the fuel injection pump 28.

The extension arm 22 is designed as a telescopic extension arm and includes, on a free end 32, a working head 34, a loader tool 38 can be attached to the working head 34 via a tool holding fixture 36 pivotally anchored on the working head 34. The extension arm 22 can be telescopically retracted or extended by means of adjustment cylinders (not shown) arranged on the interior of the extension arm 22, the extension arm 22 can be tilted by means of an actuator 40 designed as a hydraulic cylinder. The actuator 40 is connected at a first end, preferably on the piston head side, to the frame 12 and is tiltable around a rotational axis 42. On a second end, preferably on the rod side, the actuator 40 is connected to the extension arm 22 and is tiltable around a rotational axis 44. Furthermore, in the area of the free end 32, an actuator 46 is positioned on the interior of the extension arm 22 and is designed as a hydraulic cylinder. The actuator 46 serves as a leveling cylinder for the tool holding fixture 36 which is pivotally anchored on the working head 34, whereby the tool holding fixture 36 can swing vertically by means of a tilting rod assembly 48 configured on the working head 34 and connected to the actuator 46.

The actuator 40 is adapted to swing the extension arm 22 vertically, and is provided with a pressure sensor 50 on a lifting side. The pressure sensor 50 measures the pressure on the lifting side of the chamber in the actuator 40. Furthermore, on the rod side, the actuator 40 is provided with a position sensor 52, that detects the extended position of the actuator 40. Based on the extended position detected by the position sensor 52, the tilt position (slewing angle) of the extension arm 22 can be determined. As an alternative, a position sensor (not shown) which is designed as a rotational angle sensor can also be positioned on the rotational axis 24 of the extension arm 22 in order to detect the tilt position of the extension arm 22.

The actuator 46 which is adapted to swing the tool holding fixture 36 vertically includes a pressure sensor 54 on a lifting side to measure the pressure governing on the lifting side of the chamber in the actuator 46. Depending on the design and configuration of the tilting rod assembly 48, the actuator 46 can also be provided with a pressure sensor on its rod side, to measure the pressure governing in the chamber on the rod side. The advantage is that the level of pressure required in the actuator 46, to sustain the load weighing down on the loader tool 38, can be measured.

The extension arm 22 is equipped with a first and a second extension arm section 56, 58, whereby the second extension arm section 58 is supported on the interior of the first extension arm section 56 to be retractable or extendible. Another position sensor 60 is positioned on the free end of the first extension arm section 56, to detect the extended position of the second extension arm section 58.

Furthermore, the extension arm 22 is provided with a wire strain gage 62, to measure the deflection of the extension arm 22. The wire strain gage 62 is preferably positioned on the upper side of the first extension arm section 56, at the level of the rotational axis 44, since the greatest amount of deflection is to be expected at that point under a load.

Figure 2:
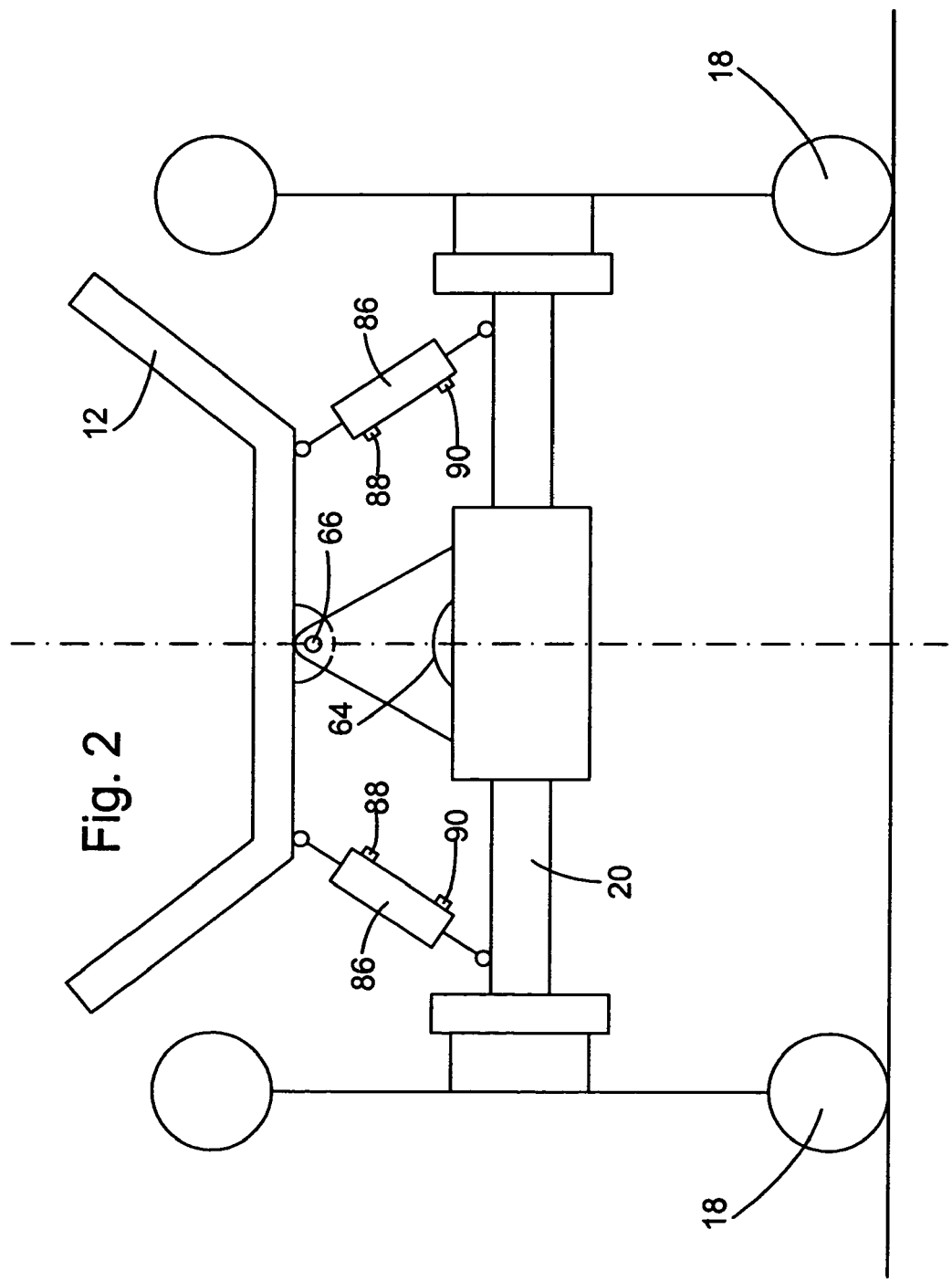
FIG. 2 a schematic cross section view of a rear axle of the loading machine shown in FIG. 1 with additional means for determining critical operating conditions.
Figure 3:
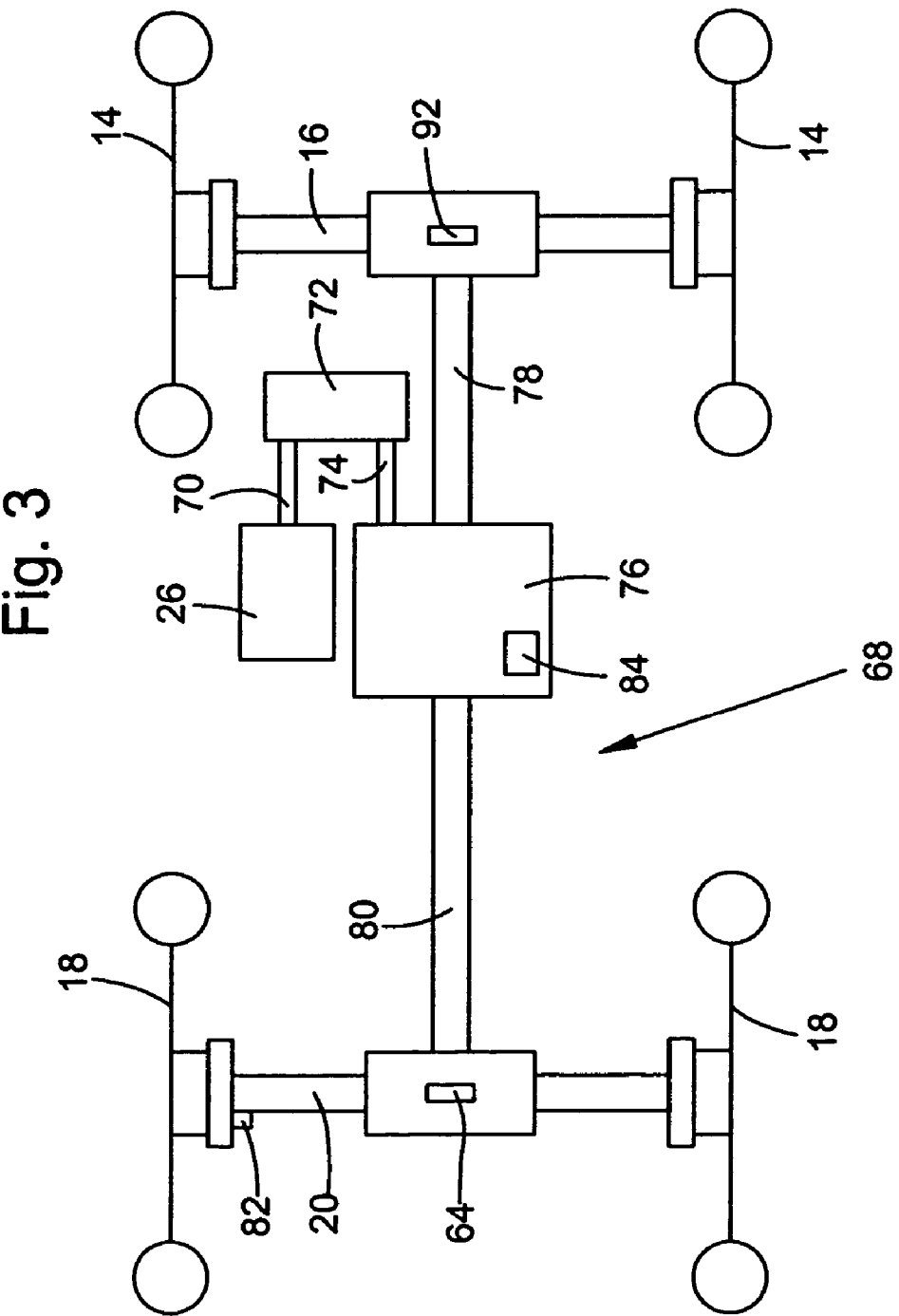
FIG. 3 a schematic representation of an all wheel drive train of the loading vehicle shown in FIG. 1.

On the rear axle of the loading machine 10, another wire strain gage 64 is provided, as shown in FIGS. 2 and 3. The rear axle 20 is preferably connected to the frame 12 by means of a swivel bearing 66, as shown in FIG. 2. The wire strain gage 64 is preferably centered relative the rear axle 20, since the center of the rear axle 20 is where the greatest deflection is to be expected under a load.

The drive train 68 of the loading machine 10 is shown in FIG. 3. Based on the driving engine 26, power input is supplied to a torque converter 72 via a torque converter drive shaft 70. The torque converter transmits this power input to a standard transmission 76 by means of a transmission drive shaft 74. From there, the power input is transmitted to the front axle 16 via a front axle drive shaft 78 and to the rear axle 20 via a rear axle drive shaft 80.

A rotational speed sensor 82 is positioned on the rear axle 20 to measure the speed by measuring the rotational speed of the rear wheel 18. Furthermore, a position sensor 84 is positioned on the transmission 76 to measure the gear position of the transmission 76.

In another embodiment, the frame 12 is connected to the front axle and rear axle 20 via hydraulically powered actuators 86. For purposes of clarification, this is represented in FIG. 2 for the rear axle 20. The hydraulic actuators 86 are designed as dual function hydraulic cylinders and are provided on the lowering side as well as on the lifting side with pressure sensors 88, 90, by means of which the pressure on the lowering side or on the lifting side of the actuators 86 can be determined.

The sensors described up to this point for determining critical operating conditions of the vehicle, such as pressure sensors 50, 54, 88, 90, position sensors 52, 60, wire strain gages, 62, 64, 92 (described below), the rotational speed sensor 82 and the position sensor 84, are intended to represent an array of different possibilities. All of the represented sensors 50, 52, 54, 60, 62, 64, 82, 84, 88, 90 are electronically connected to the control unit 30 which, in response to the signals transmitted by one or more of the sensors 50, 52, 54, 60, 62, 64, 82, 84, 88, 90, 92 generates a control signal that limits the power input to the fuel injection pump 28. Therefore, it is not required that all of the represented sensors 50, 52, 54, 60, 62, 64, 82, 84, 88, 90 be configured jointly in order to determine a critical operating state for the loading machine 10 and those that are configured define a sensor arrangement. For reasons of representation however, all of the described sensors 50, 52, 54, 60, 62, 64, 82, 84, 88, 90, 92 are shown on the same loading machine 10 as shown in FIGS. 1 through 3.

In the following, a few procedural methods shall be more closely detailed for determining critical operating conditions in the loading machine 10, these methods depicting an overload protection for the drive train 68 in conjunction with a preventive limitation of power.

One embodiment takes into consideration the flexing of the rear axle 20 as a measure for the load application on the front axle 16. This flexing of the rear axle 20 with a swivel bearing is measured by the wire strain gage 64. As soon as the rear axle 20 no longer flexes, one can assume that it is nearly free from being weighed down and that the weight of the loading machine 10, and possibly the weight of the load bearing down on the loader tool 38, rest entirely on the front axle 16. This effect of load alleviation on the rear axle 20 while simultaneously increasing the load application on the front axle 16 can be consulted for the determination of a critical operating state in the loading machine 10, and therefore, also for the determination of a risk of overload on the drive train 68, and more specifically, on the front axle drive shaft 78.

Based on an inputtable threshold value setting implemented in the control unit 30 and in response to the signal sent from the wire strain gage 64 to the control unit 30, a control signal can therefore be generated. Based on the appropriate software and hardware, as it can simply be installed by a person skilled in the art, the control signal is generated by the control unit 30 and is transmitted to the fuel injection pump 28 in order to limit the maximum permissible driving power or acceleration power made available to the engine. Thus, overload protection has been achieved for the drive train 68 of the loading machine 10. By analogy, this procedural method of setting a threshold value will be pursued in the following embodiments as well.

Another possibility exists, wherein the deflection of the extension arm 22 is detected at the appropriate position by the wire strain gage 62, preferably at the level of the rotational axis 44. The more the extension arm 22 flexes, the greater the load application must be on the front axle 16 due to the conditions of geometric layout prevailing in the loading machine 10. If the extension arm 22 is extended out, then the effects will be felt as a greater load application on the front axle since the extension of the extension arm 22 provokes a shift in load application from the rear axle 20 to the front axle 16.

The situation is the reverse in the case of the actuator 40 being extended out for the purpose of tilting the extension arm 22. Upon extending the actuator 40 out, the slewing angle of the extension arm 22 increases. The greater the slewing angle of the extension arm 22, the less the load application on the front axle will be. An additional safety factor is therefore being factored in for the determination of a critical operating state of the loading machine 10 when positing a maximum length of the extension arm 22 and a small slewing angle (or a slewing angle equal to zero). Therefore, the determination of a critical operating state at which the onset of an overload on the drive train 68 could occur for the loading machine can be established solely in dependency on the signal supplied by the wire strain gage 62. Such a determination can essentially be narrowed down to an overload protection of the drive train 68 connected to the front axle 16, or, more specifically, of the front axle drive shaft 78. When additionally taking into consideration the signals supplied by the position sensors 52, 60, one can, to a large extent, precisely determine not only the load application on the front axle 16, but the load application on the rear axle 20 as well, since the position sensors 52, 60 take into consideration the exact position of the second extension arm section 58 and the tilt position of the extension arm 22 and thus, the lever configuration conditions in the loading machine 10.

A critical operating state of the loading machine can be determined based on yet another inputtable threshold value setting implemented in the control unit 30, and in response to the signal sent by the wire strain gage 62 to the control unit 30, and possibly, also in response to the signals sent by the position sensors 52, 60 to the control unit 30. A corresponding control signal can be generated for the preventive limitation of power, whereby this limitation of power can also be implemented by electronic control of the fuel injection pump 28.

Another possibility results from the detection of the pressure on the lifting side of the actuator 40 by means of the pressure sensor 50. The measurement of the pressure that must be achieved for lifting a load bearing down on the loader tool 38 can be consulted as a measure for the load application on the front axle 16. As described above, it also applies here, that when the extension arm 22 is extended out or when the stewing angle of the extension arm 22 is narrow, the load application on the front axle 16 will be greater than when the extension arm 22 is retracted or when the slewing angle of the extension arm 22 is wide. This means that here as well, while not taking into consideration the signals supplied by the position sensors 52, 60, and while assuming a maximum length for the extension arm 22 and a narrow stewing angle (or a slewing angle equal to zero), that a reliable determination can be made as to the critical operating status of the loading machine 10. However, upon integrating the signals supplied by the position sensors 52, 60, a more precise critical operating status can be obtained for the loading machine 10, such that, unnecessarily premature initiation of preventive limitation of the power can be avoided. The generation of a control signal for the fuel injection pump 28 can therefore be implemented in analogy to the previous exemplary forms of embodiment with an additional inputtable threshold value setting implemented in the control unit 30 and, as previously discussed, in response to the signal sent by the pressure sensor 50 to the control unit 30 and, possibly, also in response to the signals sent by the position sensors 52, 60 to the control unit 30.

Another possibility is obtained from the determination of the pressure on the lifting side of the actuator 46 by means of the pressure sensor 54 in combination with a determination of the position of the extension arm or posture by means of position sensors 52, 60. The measurement of the pressure that must be generated for lifting or holding or tipping of a load weighing down on the loader tool 38 can be consulted in conjunction with the prevailing lever configuration conditions on the loading machine 10 as a measure for the load status of the loading machine 10. Once these values have been acquired, the load status can be calculated and the load application on the drive axles 16, 20 can be determined. The generation of a control signal for the fuel injection pump 28 can thus be carried out in analogy to the previous embodiments by means of another inputtable threshold value setting implemented in the control unit 30 and, as previously discussed, in response to the signals sent by the pressure sensor 54 and the position sensors 52, 60 to the control unit 30.

Another possibility for determining a critical operating state of the loading machine 10 exists, wherein the driving speed of the loading machine 10 be monitored. Based on the torque converter 72, the maximum moment of torque exerted on the drive axles 16, 20 will increase at a lower driving speed and with a lower output speed of the torque converter associated therewith. Thus, critical operating conditions occur at lower driving speeds for the loading machine 10, and this is why power limitation of the driving engine 26 can be initiated in this instance for the sake of prevention. By detection of the number of wheel revolutions on the rear axle 20 by means of the wheel speed sensor 82, the driving speed can be determined and monitored and can be consulted for the generation of a control signal by the control unit 30. The generation of a control signal for the fuel injection pump 28 can thus be carried out in analogy to the previously discussed embodiments by means of another inputtable threshold value setting implemented in the control unit 30 in response to the signal sent by the wheel speed sensor 82 to the control unit 30.

Another possibility consists in determining a critical operating status for the loading machine 10 solely by determination of the gear in which the transmission 76 is in. The generation of a control signal for the fuel injection pump 28 can thus be carried out in analogy to the previously discussed embodiments by means of another inputtable threshold value setting implemented in the control unit 30 and in response to the signal sent by the gear position sensor 84 to the control unit 30.

Another possibility consists in detecting the pressure in the actuators 86 by means of pressure sensors 89, 90. Such a configuration of actuators 86 can be installed, among other things, so as to enable tilting mobility of the frame 12 lateral to the longitudinal direction of the loading machine (lateral inclination). Furthermore, the actuators 86 can also be used for cushioning one or several drive axles 16, 20 of the loading machine 10 in order to promote riding comfort. The pressure determined by the pressure sensors 90 on the lifting side of the actuators 86 can also be used as a measure of the load application on the drive axles 16, 20, whereby, the pressure determined by the pressure sensors 88 on the lowering side of the actuators 86 can be simultaneously taken into consideration to compensate for a false reading of the measured result due to possible twisting of the actuators 86. The generation of a control signal for the fuel injection pump 28 can thus be carried out in analogy to the previously discussed embodiments by means of another inputtable threshold value setting implemented in the control unit 30 and in response to the signals sent by the pressure sensors 90 to the control unit 30 and possibly also in response to the signals sent by the pressure sensors 88 to the control unit 30.

The limitation of power is preferably implemented in that the fuel injection pump 28 is controlled by the control signal generated by the control unit 30, and as a consequence of this, the mapping characteristics of the driving engine 26 (a so-called characteristic engine graph diagram) are changed. The mapping characteristics are hereby changed in such a manner that the driving engine 26 can no longer output any greater driving power. We could hereby be dealing with a simple control or with a closed control loop. However, it is also conceivable that the limitation of power be implemented in another manner so that, for example, appropriate regulating means (not shown) are controlled by the control unit 30 or by the control signal generated, these means having the effect of directly limiting the quantity of fuel supplied to the driving engine 26 for combustion.

Although the invention was described based only on the embodiments cited above, many different types of alternatives, modifications and variants falling under the present invention can be inferred by the person skilled in the art in light of the previous description and drawings as well. Thus, for example, the loading vehicle 10 can be equipped with additional means such as, for example, with an additional wire strain gage 92, which is arranged on the front axle 16 (refer to FIG. 3), in order to determine a critical operating state of the loading machine 10 in terms of the overload status of the drive train 68.

In accordance with the provisions of the patent statutes, the present invention has been described in what is considered to represent its preferred embodiment. However, it should be noted that the invention can be practiced otherwise than as specifically illustrated and described.

What is claimed is:

1. A loading machine comprising:
 a frame supported on front and rear drive axles respectively provided with front and rear drive wheels;
 a loader arm having one end pivotally mounted to said frame for pivoting vertically about an axis extending parallel to said front and rear drive axles and having a second end mounted to a loader tool by way of a tool holding fixture;
 a hydraulic arm tilt cylinder being cooled between said frame and said arm for selectively raising and lowering said arm;
 an engine mounted on said frame and including a control device for controlling power output of said engine;
 a drive train coupled between said engine and said front and rear drive axles and including a transmission;
 an overload protection device for the drive train, the device including a sensor arrangement including at least one load sensor for sensing a load condition occurring on at least one of said arm, tilt cylinder, front axle and rear axle, and for generating a load condition signal representing said load condition;
 a control unit coupled for receiving said load condition signal and for determining whether said load condition signal is such as to indicate an overload state for the drive train and for generating a control signal when said overload state is indicated, with said control signal being coupled to said control device of the engine, which operates to reduce engine power output.

2. The loading machine according to claim 1, wherein said at least one load sensor is a wire strain gage mounted on one of said front and rear drive axles of the loading machine.

3. The loading machine according to claim 1, wherein said at least one load sensor is a wire strain gage mounted on said arm of the loading machine.

4. The loading machine according to claim 1, wherein said at least one load sensor is a pressure sensor mounted on said tilt cylinder.

5. The loading machine according to claim 1, wherein, in addition to said at least one load sensor said sensor arrangement includes at least a first position sensor for determining the position of the second end of said arm relative to said axis and for generating a position signal, which is coupled to said control unit; and said control unit using both said load signal and said position signal to arrive at said control signal.

6. The loading machine according to claim 5 wherein said first position sensor for determining the position of said second end of said arm relative to said axis is mounted onto said tilt cylinder of the loading machine and determines an angular position of said second end of said arm about said axis.

7. The loading machine according to claim 5 wherein said arm is an extension arm including first and second arm sections, with said first arm section including said first end and said second arm section including said second end and being mounted for extension and retraction relative to said first arm section; and said first position sensor for determining the position of the second end of said arm relative to said axis being mounted on said first arm section for sensing the position of said second arm section relative to said first arm section, and hence the distance of said second end from said axis.

8. The loading machine according to claim 1, wherein, in addition to said load sensor, said sensor arrangement includes a speed sensor for determining the speed of the loading machine and for generating a speed signal, which is coupled to said control unit; and said control unit using said load signal and speed signal for arriving at said control signal.

9. The loading machine according to claim 1, wherein, in addition to said load sensor, said sensor arrangement includes a gear position sensor for monitoring a shiftable gear of the transmission on the loading machine, and for generating a gear position signal, which is coupled to said control unit; and said control unit using said load signal together with said gear position signal to arrive at said control signal.

10. The loading machine according to claim 1, wherein said frame is mounted to said front and rear axles by mounting structure including a plurality of extensible and retractable hydraulic support cylinders; and said sensor arrangement including a plurality of pressure sensors which include said load sensor and are respectively mounted on said plurality of support cylinders positioned between the frame and the axles of the loading machine.

* * * * *